United States Patent [19]

Muller

[11] 4,348,899

[45] Sep. 14, 1982

[54] REVERSIBLE GAUGES

[75] Inventor: Leslie D. Muller, Pacific Palisades, Calif.

[73] Assignee: Orion Industries, Inc., Compton, Calif.

[21] Appl. No.: 130,479

[22] Filed: Mar. 14, 1980

[51] Int. Cl.³ .................... B60K 37/02; G01D 11/30
[52] U.S. Cl. ................. 73/431; 73/432 AD; 116/28 R; 248/27.1
[58] Field of Search .......... 73/431, 432 AD; 248/27.1

[56] References Cited

U.S. PATENT DOCUMENTS

| 1,878,035 | 9/1932 | Vickery | 73/432 AD |
| 2,924,495 | 2/1960 | Haines | 73/431 X |
| 2,966,257 | 12/1960 | Littlejohn | 73/431 X |
| 3,026,072 | 3/1962 | Hughes | 73/431 X |
| 3,093,002 | 6/1963 | Logan et al. | 73/431 |
| 3,438,260 | 4/1969 | Kowal et al. | 73/431 X |
| 3,724,277 | 4/1973 | Parmentier | 73/431 |
| 3,768,314 | 10/1973 | Metzler et al. | 73/432 AD |
| 3,829,599 | 8/1974 | Fujioka | 248/27.1 X |
| 3,871,606 | 3/1975 | Larson et al. | 248/27.1 |

Primary Examiner—Daniel M. Yasich
Attorney, Agent, or Firm—Fulwider, Patton, Rieber, Lee & Utecht

[57] ABSTRACT

A gauge mounting device is provided for use in the instrument panel area of a vehicle and includes a pair of frames arranged to fit back to back in mating disposition. The outwardly facing surface of each frame is color, texture and style coordinated with the vehicle interior and to suit the preference of the user. The frames include congruent bezels with at least one gauge mounted against a bezel in one frame with an umbilical sensor connector extending through the corresponding bezel in the opposite frame.

7 Claims, 5 Drawing Figures

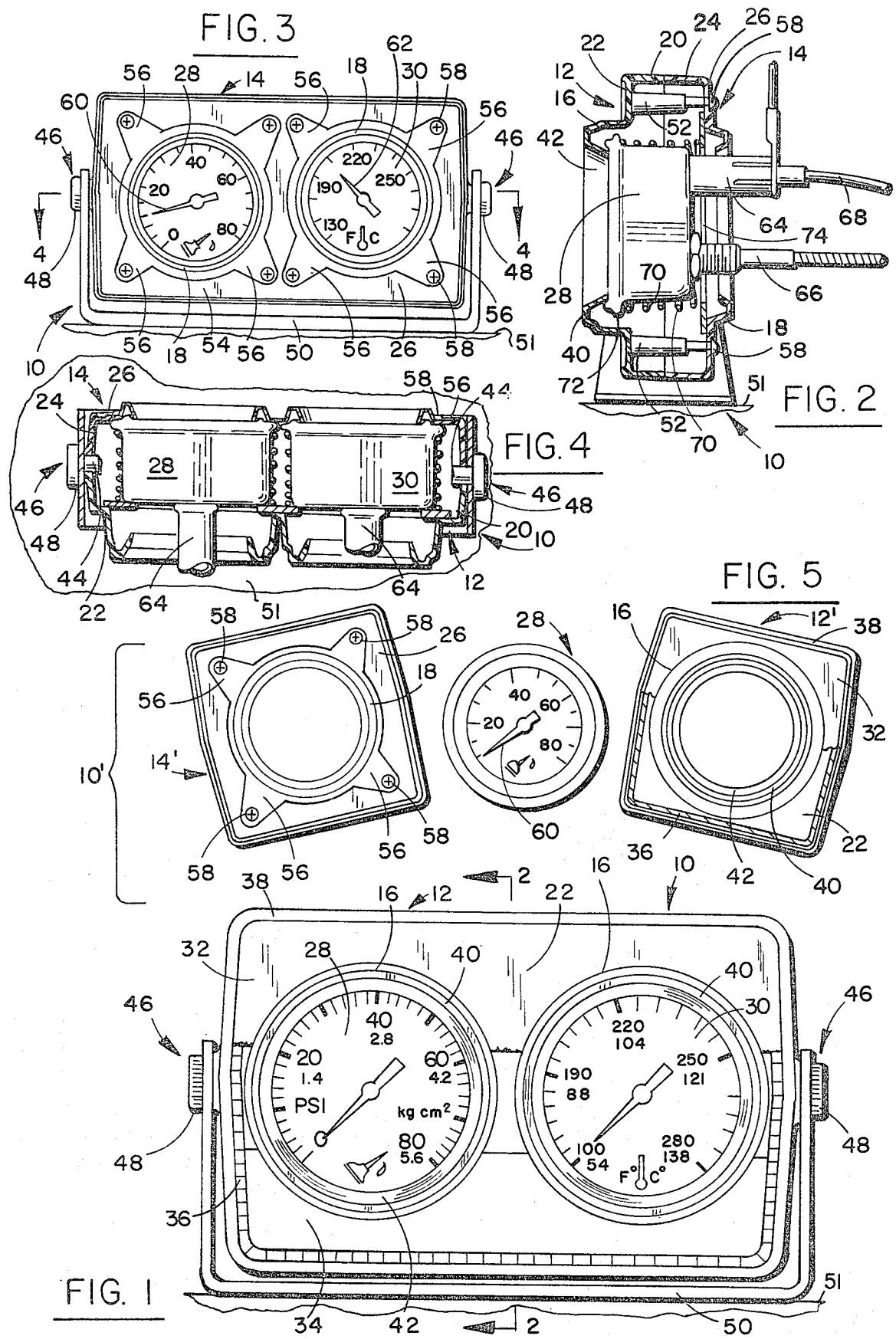

REVERSIBLE GAUGES

BACKGROUND OF THE INVENTION

1. Field of the Invention

The present invention relates to gauge mounting devices for installation in the instrument panel area of a vehicle.

2. Description of the Prior Art

Various gauge mounting arrangements have been devised for mounting indicator gauges both in the face of an instrument panel and above and below vehicle dashboards. It has heretofore been necessary to provide several different styles of gauge mounts in order to accomodate the differing styles of vehicle interiors and to suit the preference of the user. This has led to an excessively large requirement for inventory by merchants in such products in order to keep a plurality of styles of gauge mounts in stock in order to be able to promptly provide a requested style of gauge. Also, the requirement for several styles of functionally equivalent gauge mounting devices for use in a vehicle instrument panel has led to numerous instances of provision of the wrong style and confusion in ordering supplies of gauge mounts for retail sale. The only alternative to stocking multiple lines of gauge mounts has been the provision of gauge mounts in a uniform, nondescript style designed to be as inoffensive to as many prospective users as possible. Although such gauge mounts may be innocuous, they also tend to be extremely bland in appearance and are attractive to only a very small minority of prospective users.

SUMMARY OF THE INVENTION

One object of the present invention is to provide a single, universal gauge mount which incorporates distinctive design features in a single mounting device. The device of the invention includes two gauge frames, arranged in back to back relationship, each having an outwardly facing surface. The outer surfaces of the two gauge frames have markings which are distinct from one another. These markings may include textural differences in the surface finish, emblazonments, features formed in relief, and distinctive coloring. Numerous alternative design features can be incorporated onto the oppositely facing surfaces. An individual utilizing the gauge mounting device is thereby able to orient the gauge mount with the side bearing the preferred distinctive markings facing toward the interior of a vehicle cab. The opposite side is either not visible at all or is visible only obscurely from the exterior of the vehicle. The mounting frames are constructed essentially in mirror image shapes, so that the faces of gauges mounted therein can be oriented for observation alternatively through congruent bezels in the opposing frames.

By utilizing the device of the invention, auto accessory manufacturers and distributors are able to provide a customer with selected design features in a single gauge mounting device. There is no necessity for stocking a plurality of functionally equivalent gauge mounts, since a single device of the unique construction described herein suffices to provide the user with a gauge mount having alternative and distinctive design features. As a result, difficulties and errors in ordering stock, and in the provision of different styles of gauge mounts are avoided. Moreover, by providing a gauge mounting device having alternatively observable design features, the amount of shelf space required for retail display to customers and shelf storage area is reduced.

The invention may be described with greater clarity and particularity by reference to the accompanying drawings.

DESCRIPTION OF THE DRAWINGS

FIG. 1 is an elevational view of one embodiment of the device with gauges positioned to face outwardly from one gauge frame.

FIG. 2 is a sectional elevational view taken along the lines 2—2 of FIG. 1.

FIG. 3 is an elevational view showing gauges positioned to face outwardly from the opposite gauge frame as contrasted with FIG. 1.

FIG. 4 is a sectional plan view taken along the lines 4—4 of FIG. 3.

FIG. 5 illustrates the component parts of an alternative embodiment of the invention.

DESCRIPTION OF THE EMBODIMENTS

FIGS. 1-4 illustrate a gauge mounting device 10 adapted to be mounted in the instrument panel area of a vehicle, such as an automotive vehicle. FIGS. 2 and 4 illustrate a pair of mating, generally concave molded plastic gauge frames 12 and 14, releasably fastened together in back to back fashion to entrap two drum-shaped gauges 28 and 30 therebetween to face outwardly from one of the gauge frames. The first gauge frame 12 has two annular bezels 16, positioned side by side as illustrated in FIG. 1. The second gauge frame 14 has corresponding annular bezels 18, likewise positioned side by side as illustrated in FIG. 3. As depicted in FIGS. 2 and 4, the gauge frame 12 has a rim 20 extending about the perimeter of the gauge frame 12 and extending rearwardly from an outer surface 22 into which the bezels 16 are formed. Likewise, the gauge frame 14 has a rim 24 that extends rearwardly from an outwardly facing surface 26, as depicted in FIGS. 2, 3 and 4. As illustrated in FIGS. 2 and 4, the gauge frames 12 and 14 are arranged in back to back mating fashion so that the respective outer surfaces 22 and 26 are disposed to face outwardly in opposite directions. The encompassing rims 20 and 24 of the gauge frames 12 and 14, respectively, are congruently aligned and reside in mutual abutment about their common perimeter. Each bezel 16 on the gauge frame 12 is axially and congruently aligned with a corresponding bezel 18 in the gauge frame 14. Although the gauge frames 12 and 14 fit together in mating fashion, their outwardly facing surfaces 22 and 26, respectively, each have markings distinct from one another.

In the embodiment of FIGS. 1-4 a pair of gauges 28 and 30, both generally of disk-shaped configuration, are associated with each pair of mutually congruent bezels 16, 18. The gauges 28 and 30 are reversibly mounted between the bezels 16, 18 with which they are associated and between the gauge frames 12 and 14. As depicted, the gauges 28 and 30 may be arranged to face outwardly from the outer surface 22 of the gauge frame 12 as depicted in FIG. 1. Alternatively, the gauges 28 and 30 may be reversed to face outwardly from the surface 26 of the gauge frame 14, as depicted in FIG. 3.

Both of the gauge frames 12 and 14 are integrally molded rigid plastic structures. The outwardly facing surface 22 of the gauge frame 12 is divided horizontally slightly above the center of the gauge frame 12 into an upper section 32 which has a smooth finish and is colored in varying shades of brown to produce a burlwood accent. The bottom portion 34 of the surface 22 has a textured, black finish and is molded to produce indentations which imitate a line of stitching 36 near the edge thereof. The entire perimeter of the surface 22 is surrounded by a raised lip 38, all as depicted in FIG. 1. The bezels 16 are raised and slightly tapered annular structures with a finish matching the bottom portion 34 of the surface 22 and having flat ring-like edge surfaces 40 at their protruding extremities. Inwardly from the edge surfaces 40 the bezels 16 have sloping surfaces 42 that are textured to define a series of concentric rings progressing inwardly toward the faces of the gauges 28 and 30, as depicted in FIG. 1. As illustrated in FIG. 2, there are four generally cylindrical interiorly threaded posts 52 that extend toward the mounting frame 14 and beyond the edge of the rim 20 from the inside surface of the mounting frame 12 near each corner thereof.

The edge of the rim 20 of the frame 12 is recessed on opposite sides to define concave U-shaped mounting slots which receive the shanks 44 of inwardly projecting pivot mounting studs 46, as depicted in FIGS. 1, 3 and 4. The mounting studs 46 include enlarged knurled knob-like heads 48 and the shanks 44 extending inwardly therefrom are coaxial along a horizontal axis which is parallel to and lies between the outwardly facing surfaces 22 and 26 of the gauge frames 12 and 14 respectively. The mounting studs 46 support the gauge mounting device 10 for rotation about a horizontal axis and rest in a generally U-shaped cradle 50 which has upwardly extending arms with coaxial apertures therein to receive the shanks 44 of the mounting studs 46. The U-shaped mounting bracket 50 may be disposed as depicted to support the gauge mounting device 10 above a horizontal surface 51, such as the upper surface of a conventional vehicle dashboard containing the vehicle instrument panel. The gauge mounting device is oriented to face the interior of the vehicle cab. Alternatively, the U-shaped mounting bracket 50 may be inverted and used to support the gauge-mounting device 10 below the vehicle dashboard.

The outwardly facing surface 26 of the mounting frame 14 is visible in FIG. 3 and is distinctively marked with a precision military look, including a background 54 having a black matte finish. The bezels 18 are formed with a smooth finish and, although integrally formed on the surface 26, are raised therefrom in relief so as to simulate separable retaining rings. To further this simulation, the bezels 18 are provided with four diagonally extending generally triangular shaped false fastening tabs 56 extending outwardly in raised fashion above the surface 26 in a radial array. Phillips head screws 58 extend through each of the false mounting tabs 56 toward the interior of the gauge mounting device 10, and are aligned and threadably engageable with the posts 52, as depicted in FIG. 2.

The gauges 28 and 30 are constructed with calibrated dials on their outwardly directed faces, as depicted in FIGS. 1 and 4. Pointers 60 and 62 indicate a sensed measurement in analog fashion. More specifically, in the embodiment of FIGS. 1-4 the gauge 28 senses oil pressure in a vehicle crank case while the gauge 30 senses radiator water temperature in the vehicle. As illustrated in FIGS. 2 and 4, the gauges 28 and 30 each include rearwardly extending bulb sockets 64 to house electrical light bulbs for illuminating the dial faces. Each of the gauges 28 and 30 has an umbilical connector 66 also protruding rearwardly therefrom. Electrical wires 68 also extend in umbilical fashion to a voltage source to illuminate bulbs in the sockets 64.

As illustrated in FIGS. 2 and 4, the gauges 28 and 30 are entrapped between the mounting frames 12 and 14. The dial faces of the gauges 28 and 30 are biased forwardly against the bezels of one or the other of the mounting frames 12 or 14. Specifically, when arranged as depicted in FIGS. 1 and 2, the dial faces of the gauges 28 and 30 reside in contact with the inner contact surfaces of the bezels 16 and are held in position by a compressed coil spring 70 which bears against a radially protruding rim 72 surrounding the dial faces of the gauges and against an annular retaining ring 74 which rests in abutment against the opposite mounting frame 14.

As is apparent in comparing FIGS. 1 and 2 with FIGS. 3 and 4, the gauges 28 and 30 may be reversed to face outwardly from either the outer surface 22 of the mounting frame 12 or from the outer surface 26 of the mounting frame 14. The gauges 28 and 30 can be reversed so that the surface from which they face can be either the distinctive style of the surface 22, or the alternate distinctive style of the surface 26. To reverse the disposition of the mounting gauges 28 and 30, the umbilical connections of the mounting gauges must be disconnected. The screws 58 are then loosened from the fastening posts 52 and the spring 70 is relaxed. The mounting frames 12 and 14 are then pulled apart from each other and the arrangement of the mounting frames 12 and 14 can be reversed to either the positions of FIGS. 1 and 2, on the one hand, or the positions of FIGS. 3 and 4, on the other. Thus when it is desired to face gauges 28 and 30 in an opposing direction from that shown in FIG. 2, frames 12 and 14 are released each from the other by unthreading of posts 52 subsequent to removal of the umbilical connections. Retaining ring 74 is then mounted against an inner shoulder surface of frame 20 adjacent annular bezels 16 and 18. Gauges 28 and 30 ae then inserted in a manner such that the dial faces of gauges 28 and 30 face through annular bezels 16 and 18. Springs 70 are mounted around gauges 28 and 30 and threaded posts 52 are threadedly secured in order to releasably secure frames 12 and 14.

The generally flat rear surfaces of the mounting gauges 28 and 30 from which the bulb sockets 64 and umbilical connections 66 extend reside in close proximity to the bezel from which the umbilical connections 66 and 68 protrude to give the back of the mounting device 10 a closed appearance, and also to aid in keeping the interior of the mounting device 10 clean.

As illustrated in FIGS. 1-4, the mounting device 10 may be provided with multiple congruent bezels. Alternatively, and as depicted in FIG. 5, a mounting device may be constructed with but a single pair of congruent bezels. The identifying numerical indicia of the gauge mounting components depicted in FIG. 5 find functional correspondence in the components described in conjunction with FIGS. 1-4. The embodiment of FIG. 5 differs from that of FIGS. 1-4 in that gauge mounting device 10' includes frames 14' and 12' which are clearly seen to be adapted to accommodate a single gauge such as gauge 28 as depicted. Alternatively, mounting frames suitable for receiving three or more gauges may be constructed according to the principles described in conjunction with FIGS. 1-4.

Undoubtedly, numerous variations and modifications of the invention will become readily apparent to those familiar with automotive vehicle accessories and gauge mounting devices. For example, gauge mounting devices for tachometers, speedometers, ammeters and other devices may be constructed according to the invention. Also, numerous different styles and distinctive markings may be substituted for those described in conjunction with the drawings. The distinctive styling of the outwardly facing surfaces 22 and 26 illustrated in the drawings forms no part of the invention claimed herein, but rather the invention resides in the structural arrangement of the mating gauge frames 12 which allows gauge dials to be displayed from a plurality of alternatively styled mountings in a releasable mounting arrangement as described.

Accordingly the invention should not be construed as limited to the specific embodiments depicted and described, but rather is defined in the claims appended hereto.

I claim:

1. A gauge mount for location facing forward the interior of a vehicle cab in the instrument panel area in the cab of the vehicle comprising first and second gauge frames releasably secured each to the other, each of said gauge frames having a rim about the perimeter thereof, and said frames are arranged to fit together in back to back fashion each with an outer surface having at least one bezel therein, said bezels in said back to back frames facing in opposite directions, and said rims are congruently aligned, and each bezel of each of said frames is mutually congruent to a bezel in the other frame, and said outer surfaces of said frames have markings distinct from one another, and further comprising a gauge resiliently confined between means on the interior of said frames and fitted against said pair of mutually congruent bezels and arranged to be reversibly mounted between said gauge frames to selectively and alternatively face each of said bezels in said pair.

2. A gauge mount instrument according to claim 1 further comprising fastening means holding said gauge frames together and biasing means between said frames urging each gauge against a bezel in a single one of said frames.

3. A gauge mount according to claim 2 further characterized in that the bezels of said second frame are integrally formed and raised from the outer surface thereof with false fastening tabs thereon, and said fasteners include screws extending through said false fastening tabs, and said first frame has interiorally threaded posts extending toward said second frame, and said screws are threadably and releasably engageable therein.

4. A gauge mount according to claim 1 further characterized in that said rims of said first and second frames reside in mutual abutment.

5. A gauge mount according to claim 4 further characterized in that each gauge has a forward face and a rearwardly extending umbilical connector for receiving sensed signals, and said forward face resides in abutment against a bezel of one of said frames and said umbilical connector protrudes through the congruent bezel in the other frame.

6. A gauge mount according to claim 4 further characterized in that horizontally aligned mounting slots are defined in at least one of said rims on opposite sides thereof, and further comprising a cradle with pivot mountings extending into said mounting slots to mount said frames in said cradle for rotation about a horizontal axis.

7. A gauge mount according to claim 1 further characterized in that said frames both include multiple bezels.

* * * * *